United States Patent
Moore

(10) Patent No.: US 8,352,387 B2
(45) Date of Patent: Jan. 8, 2013

(54) LEGACY SYSTEM SUPPORT

(75) Inventor: Devin C. Moore, Lewis Center, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 420 days.

(21) Appl. No.: 12/784,187

(22) Filed: May 20, 2010

(65) Prior Publication Data
US 2011/0289027 A1 Nov. 24, 2011

(51) Int. Cl.
*G06F 15/18* (2006.01)
(52) U.S. Cl. .......................................... 706/12
(58) Field of Classification Search ....................... 706/12
See application file for complete search history.

(56) References Cited

U.S. PATENT DOCUMENTS

| | | | |
|---|---|---|---|
| 7,403,904 B2 * | 7/2008 | Abe et al. ..................... | 705/7.29 |
| 7,610,233 B1 * | 10/2009 | Leong et al. .................. | 705/37 |
| 7,716,077 B1 * | 5/2010 | Mikurak ....................... | 705/7.12 |
| 7,957,991 B2 * | 6/2011 | Mikurak ....................... | 705/7.11 |
| 8,032,409 B1 * | 10/2011 | Mikurak ....................... | 705/14.26 |
| 8,121,874 B1 * | 2/2012 | Guheen et al. ................ | 705/7.11 |

* cited by examiner

*Primary Examiner* — Michael B Holmes

(57) ABSTRACT

A system for adapting a legacy system to a new environment includes a method of learning the behavior of a legacy system and a method for replacing a legacy system.

Learning the behavior of a legacy system includes gathering information with respect to inputs, outputs, and internal function of the legacy system; defining from the gathered information a set of behavioral rules describing the legacy system; and testing the rules by applying known inputs to the legacy system and verifying that the legacy system responds as predicted by the rules.

Replacing a legacy system includes monitoring legacy system responses to legacy system inputs; defining a set of rules describing behavior of the legacy system based on the responses to the inputs; comparing actual legacy system responses to responses predicted by the set of rules; and using the set of rules to create a replacement system that mimics the legacy system.

25 Claims, 11 Drawing Sheets

LEGACY SYSTEM SUPPORT

BACKGROUND

A legacy system may be any existing system including hardware components and software components that together perform a process or processes. Over time the hardware components of a legacy system become obsolete and may no longer be supported as by way of maintenance contracts. Compounding the issue of obsolete hardware components is the issue of undocumented or poorly documented software components, preventing the software components of a legacy system from being adapted to new hardware components without extensive reverse engineering of the software code. Additionally or alternatively, some or all of the software components may be written so as to run only on specific hardware components such as specific computer processors, servers, and database stores, in which case the software components cannot be ported to new hardware components.

Further, when legacy system processes are undocumented or poorly documented, it may not be possible to create new software components to accomplish the legacy system processes, as there may be no clear understanding of the full extent of what the legacy system processes are intended to accomplish.

The combination of hardware component obsolescence and lack of software component documentation and/or process documentation can leave a legacy system vulnerable to system failure without the possibility of meaningful remedial action.

An additional concern is that no reasonable options may be available to augment or duplicate a legacy system for expanded process capability because of hardware component obsolescence and/or software component lack of adaptability.

There exists, therefore, a need to be able to first learn the behavior of a legacy system, and then to create a new system that mimics the behavior of the legacy system, using modern hardware components and at least partially new software components.

DETAILED DESCRIPTION

A legacy system may be any existing system including hardware components and software components that together perform a legacy process or processes. It may be desirable to copy or replace the legacy system with a new system that functionally mimics the legacy processes of the legacy system.

To create a new system that functionally mimics a legacy process, the behavior of the legacy system as it performs the process must be learned. Learning the behavior of a legacy system includes, for example, monitoring the legacy process during operation and gathering information with respect to inputs and outputs of the legacy process. Behavior may also be learned by probing the internal function of the legacy process to gather additional information. From the gathered information a set of rules describing the behavior of the legacy system may be defined. The defined rules may be tested by applying known inputs to legacy processes and verifying that the legacy system responds as predicted by the set of rules.

As more rules are defined and added to the rule set, eventually the rule set may adequately represent the legacy process or processes. The rule set may then be used to create a replacement system that mimics the legacy system. Such a replacement system is referred to herein as a legacy mimic.

A situation that may need to be addressed as a legacy system ages and before a legacy mimic is available is that the format of some modern inputs desired to be submitted to a legacy process may be different from the format of the corresponding inputs expected by the legacy process. Similarly, the format of some outputs from a legacy process may be different than is required for use in modern downstream processes. In such cases, it may be desirable to create rules for a legacy interface that adapts legacy processes to modern format input and output requirements.

A suite of software tools may be used to accomplish the multiple goals of monitoring and probing a legacy process to learn its behavior, and adapting a legacy process to modern requirements. The suite may include one or more of a translator, a rule checker, a monitor, and a bypasser tool. These tools are described below.

Figure 1A:
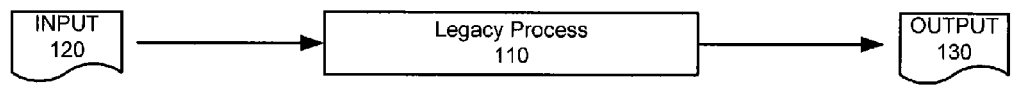
FIG. 1A illustrates a legacy process with inputs and outputs.
Figure 1B:
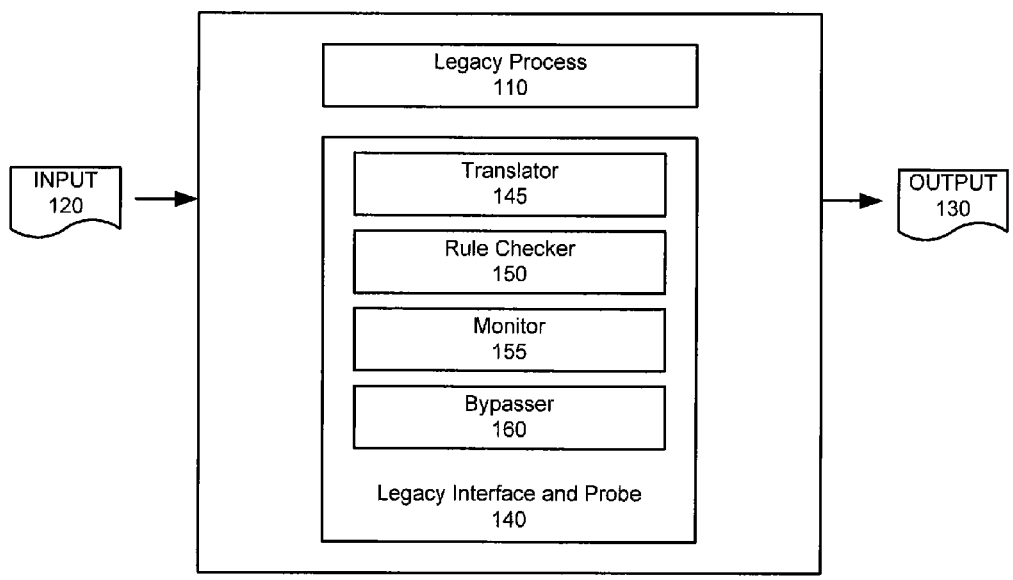
FIG. 1B illustrates an exemplary system for learning the behavior of the legacy process.
Figure 1C:
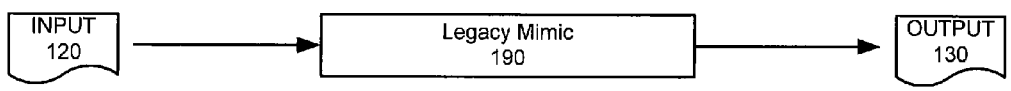
FIG. 1C illustrates an exemplary system that acts as a legacy mimic for replacing the legacy process.

FIGS. 1A-C illustrate, respectively: a legacy process of a legacy system; an exemplary tool suite that interfaces to the legacy system and monitors and probes the legacy system processes; and a legacy mimic, which may be a replacement for the legacy system.

In FIG. 1A, a legacy process 110 accepts some form of input 120 and generates some form of output 130. Legacy process 110 is discussed in detail below with respect to FIG. 2. Input 120 represents one or more submissions into legacy process 110. Submissions are generally in electronic form but may also include a manual process. For example, an input 120 may be a hard-copy text document that is first manually scanned and then converted via software into a non hard-copy text document format, such as by way of Adobe® Acrobat® to submit to legacy process 110 electronically. Electronic-based submission may include, for example, making a function call into a software component, storing a document in a database for later access, or updating a flag in memory. There are numerous ways in which legacy process 110 may accept an input 120 and the ones discussed above are merely exemplary.

Output 130 represents one or more outputs generated by legacy process 110. A generated output is generally in electronic form, but may also include a manual process. For example, legacy process 110 may generate an electronic file in a database that is later manually directed to a printer. In this case, the file sent to the printer may be considered as an output 130, or, alternatively, both the file generated in the database and the file sent to the printer may be considered as two separate outputs 130. Electronic output generation may include, for example, storing a document in a database; generating an email; or changing a data element in a software object such as a "struct" as used in the C programming language, or any other object used in object-oriented programming. There are numerous ways in which legacy process 110 may generate an output 130, beyond the exemplary illustrations provided above.

Input 120 and output 130 may have a one-to-one relationship, but may alternatively have a many-to-one or one-to-many relationship. In a one-to-one relationship, legacy process 110 may generate one output 130 in response to receiving one input 120. For example, an input 120 may be a customer letter denoting a change of address and a corresponding output 130 may be an update to a customer information database. In a many-to-one relationship, legacy process 110 may generate one output 130 only after receiving multiple inputs 120. For example, multiple new customer requests may be received as inputs 120, and a single output 130 may be a service request with a list of corresponding new service connections to make. In a one-to-many relationship, legacy process 110 may receive one input 120 and generate multiple outputs 130 in response. For example, an email including a link to a location in a database containing customer usage data may be received as an input 120, and multiple customer billing statements may be generated as corresponding outputs 130.

An output or outputs 130 may follow an input or inputs 120 within a short period of time. For example, an input 120 may be a function call into a software component that generates an output 130 immediately. Alternatively, there may be no direct time and/or causal relationship between input 120 and output 130. For example, a database of dynamic Uniform Resource Identifiers (URIs) related to customer network equipment may be updated continuously as customers turn the associated network equipment on or off. As a piece of network equipment is turned on, a URI may be assigned to the network equipment, and the database updated to reflect the assignment. The database update may be an input 120 into legacy process 110. Continuing with the example, a software update for a specific model of network equipment may become available, in which case legacy process 110 may identify customer equipment that should receive the software update and provide the software update to the customer equipment over the network to the corresponding URI from the database. Provision of the software update may be an output 130 from legacy process 110. In this example, the inputs 120 to legacy process 110 are URI database updates, and outputs 130 from legacy process 110 are network equipment software updates, therefore there is no time relationship and no causal relationship between the inputs 120 and the outputs 130.

Legacy process 110 hardware components become obsolete over time, necessitating replacement by new and different types of hardware. If the software components of legacy process 110 are fully documented, it may be possible to reconfigure the software components to operate on new hardware. However, if the software components of legacy process 110 are not fully documented, or are poorly documented, or are written very specifically for the obsolete hardware components, then it may not be possible to port all of the software components to the new hardware components. In this case, it is desirable to replace the entire legacy process 110 with a new process including new hardware components and new software components. To be an adequate replacement for legacy process 110, the new process would need to be designed to follow a set of rules for accepting inputs 120 and generating outputs 130 in a manner consistent with the functionality of legacy process 110. One concept for defining the rules to create such a new process is embodied in the suite of software tools of legacy interface/probe 140, illustrated in FIG. 1B.

In FIG. 1B, legacy interface/probe 140 co-exists with legacy process 110, and learns the internal behavior of legacy process 110. A set of behavioral rules is created or extended based on what legacy interface/probe 140 learns. The suite of software tools of legacy interface/probe 140 includes a translator 145, a rule checker 150, a monitor 155, and a bypasser 160.

Input 120 is applied to legacy process 110 and to legacy interface/probe 140, and output 130 is generated by legacy process 110 or translator 145 of legacy interface/probe 140. The exemplary components illustrated in FIG. 1B are not intended to be limiting, and additional or alternative components may be used.

Translator 145 translates files entered as input 120 into a format recognizable by legacy process 110. Translation is necessary for example when information is presented to legacy process 110 in a format that did not exist when the underlying legacy system was designed. For example, a modern file format may include megabytes of data, whereas legacy process 110 was designed to handle an input 120 of maximum 100 kilobytes of data. In this case, translator 145 may divide the modern file into sub-parts and submit the sub-parts to legacy process 110 in a sequence of files, each limited to 100 kilobytes of data. Correspondingly, continuing with the example, translator 145 may also need to combine multiple outputs of legacy process 110 into a larger modern file format. In another example, translator 145 may convert files between Microsoft Word .doc and .docx formats because .docx format did not exist when legacy process 110 was designed.

Translator 145 is described further below with respect to FIG. 3 and FIG. 4.

Rule checker 150 performs services of verifying the format of inputs 120 and outputs 130 based on a set of rules describing legacy process 110. As legacy interface/probe 140 learns more of the behavior of legacy process 110, more rules are generated for rule checker 150 to use.

One service of rule checker 150 may be to verify that inputs 120 are in proper format for use by legacy process 110. This service may be used, e.g., to check the translations of translator 145 or to flag or block inputs 120 that are in a modern format but did not get translated. Another service of rule checker 150 may be to identify if legacy process 110 generates an unexpected output, and make a notification that a new rule related to the behavior of legacy process 110 may need to be defined. Yet another service of rule checker 150 may be to test the rules already in the set of rules by submitting a test input 120 and verifying that legacy process 110 behavior is anticipated correctly by rule checker 150.

In sum, rule checker 150 may facilitate both active and passive testing. Passive testing as described above may be used to keep legacy process 110 functioning properly by passively checking inputs 120 and preventing incorrectly-formatted inputs 120, or may be used for identifying when new rules are needed. Active testing as described above may be used to test the legitimacy of the existing rules by actively entering known inputs to legacy process 110.

Rule checker 150 is further described below with respect to FIGS. 5-7.

In addition to the passive and active testing of rule checker 150, additional passive testing and information gathering may be provided by monitor 155. Monitor 155 monitors inputs 120, outputs 130, and intermediate outputs within legacy process 110. Monitor 155 may, e.g., parse inputs 120 and outputs 130 and log parsed data to generate a history of legacy process 110 behavior. The information gathered by monitor 155 may then be used to identify new rules describing legacy process 110 for rule checker 150 to use.

Monitor 155 is further described below with respect to FIG. 8 and FIG. 9.

Bypasser 160 forces proper behavior on legacy process 110. In some cases, legacy process 110 does not consistently perform part of its process. When such an inconsistency is identified, a specific action may be required to remedy the effect of the inconsistency. A bypass rule is defined, and when the set of circumstances exists that triggers the inconsistency, bypasser 160 performs the associated remedial action. Bypasser 160 may access internal legacy process 110 memory in order to perform its remedial actions. For example, legacy process 110 may be a billing system in which input 120 is customer usage data for multiple customers and output 130 is a file sent to a printer to generate billing statements for the multiple customers. In this exemplary billing system, a certain set of the billing statements may not include a due date, and to remedy this known problem, bypasser 160 may have a rule to add the billing date to each of the billing entries in which the billing date is missing, before the file is sent to the printer.

Rules for bypasser 160 are generally not necessary to include in the set of rules used for a legacy mimic 190 because the bypasser 160 rules are used to fix errors of legacy process 110. However, some bypasser 160 rules, e.g., rules necessary only because of modern format inputs, may be used in the set of rules defining a legacy mimic 190.

Over a sufficient amount of time, the behavior of legacy process 110, or of a sub-process of legacy process 110, will be effectively modeled by the set of rules used by legacy interface/probe 140. These rules, as discussed above, represent behavior observed by monitor 155, checked by rule checker 150, and incorporated into the function of translator 145 and bypasser 160. Once a level of confidence is reached that the rules are acceptably accurate, legacy process 110, or one or more of its sub-processes, may be replaced with a legacy mimic 190. In this way, the behavior of legacy process 110 is retained without the necessity of writing completely new software components. Further, legacy mimic 190 may then be implemented on new hardware components, thus preventing catastrophic results that could occur from a failure of the obsolete hardware components of legacy process 110.

FIG. 1C illustrates the concept of a legacy mimic 190, which represents a system based on rules identified from the behavior of legacy process 110. When fully operational, legacy mimic 190 may be effectively a replication of legacy process 110.

Legacy interface/probe 140 and legacy mimic 190 may be any combination of software components, hardware components, and firmware. Additionally, although one example of the modularization of legacy interface/probe 140 is illustrated and described, it should be understood that the operations may be provided by fewer, greater, or differently named modules.

In general, computing systems and/or devices, such as those of legacy process 110, legacy interface/probe 140, or legacy mimic 190, may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, and handheld computer.

Computing devices generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Legacy process 110, legacy interface/probe 140, and legacy mimic 190 were described in overview above, along with a description of how legacy mimic 190 is defined in order to replace legacy process 110. The discussion now proceeds to a description of legacy process 110 and the components of legacy interface/probe 140 in more detail.

Legacy Process 110

Figure 2:
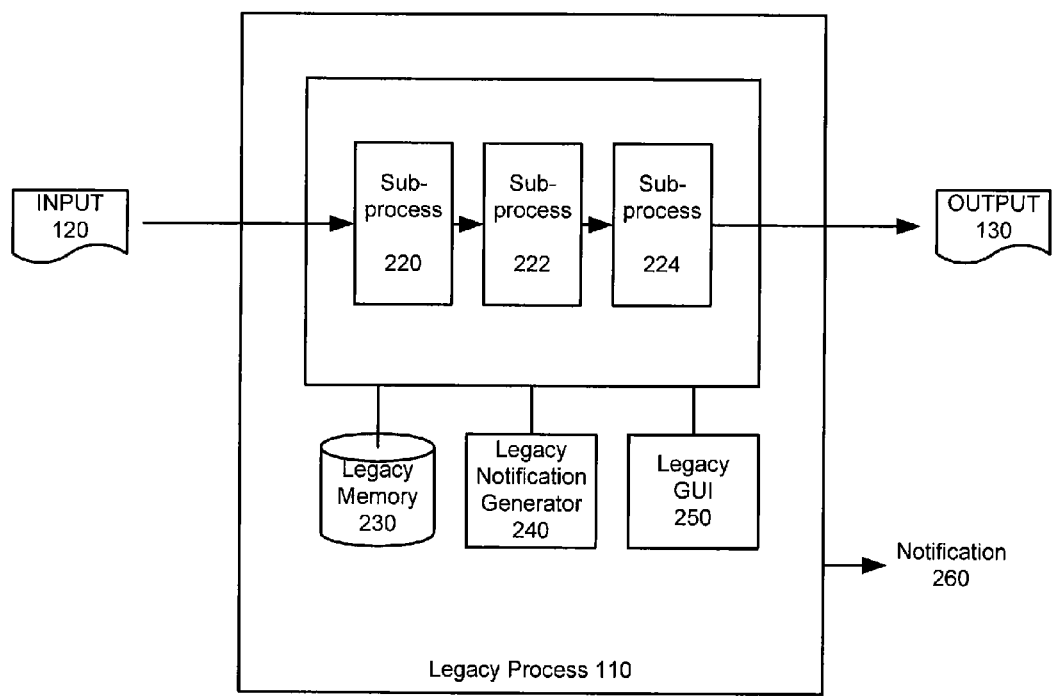
FIG. 2 illustrates details of an exemplary legacy process.

FIG. 2 illustrates an exemplary legacy process 110 that includes sub-processes 220, 222, and 224, legacy memory 230, legacy notification generator 240, and legacy graphical user interface (GUI) 250. Also included is a notification 260 provided by legacy process 110. Legacy process 110 may include more or less components than those shown in FIG. 2.

Legacy process 110 accepts inputs 120 and generates outputs 130 as described above. Within legacy process 110 there may be one or more sub-processes such as sub-processes 220, 222, and 224, each of which accepts inputs and generates outputs. The outputs of one sub-process may be the inputs to another sub-process or sub-processes. There are numerous ways in which sub-processes may communicate with each other, including, for example, passing pointers, calling subroutines, saving data to memory, or setting flags in a register. Sub-processes such as 220, 222, and 224 may run in any combination of parallel and sequential operation.

Legacy process 110 includes some form of memory, shown as legacy memory 230, for storing instructions and/or data. Legacy memory 230 is illustrated as a database for convenience, but may be any volatile or non-volatile memory type, or any combination of memory types, any of which may include one or more databases. Databases and memory types are described above in detail. Memory 230 may be used by any or all sub-processes such as sub-processes 220, 222, and 224. Legacy notification generator 240 and legacy GUI 250 may also access monitor memory 230 for instructions and/or data.

Legacy process 110 may include a legacy notification generator 240 that responds to pre-identified circumstances by generating some form of notification 260. Types of notifications 260 may include but are not limited to email, pop-up windows, and log file entries. More than one type of notification 260 may be used. A particular type of notification 260 may be generated according to, e.g., the severity of the circumstances. For example, notification generator 240 may write an entry into a log file when a group of tasks are completed by legacy sub-processes 220, 222, or 224. As another example, notification generator 240 may cause a pop-up window to appear in a control room if a data overflow condition occurs. As yet another example, notification generator 240 may send an email containing a scan summary when a self-check software component completes a memory scan of legacy memory 230.

Legacy process 110 may further include a legacy graphic user interface (GUI) 250 that allows user control and monitoring of legacy process 110 and/or its sub-processes. GUI 250 may be any audiovisual interface between a user and legacy process 110.

Figure 3:
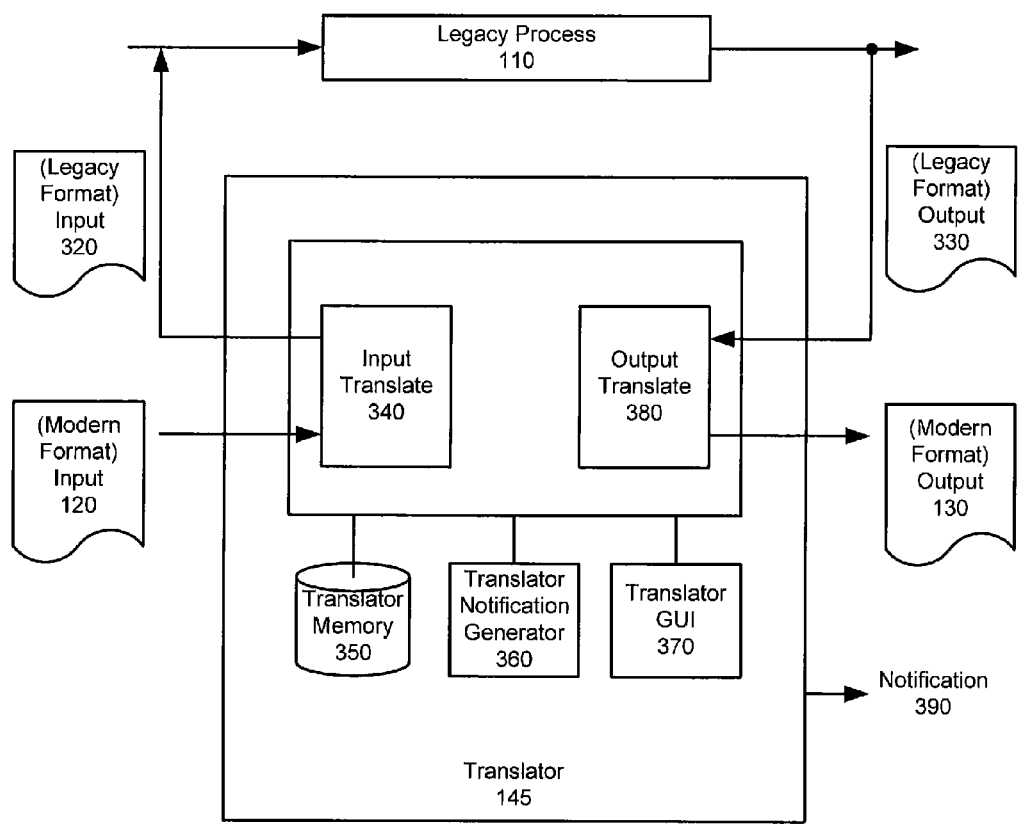
FIG. 3 illustrates an exemplary translator for translating files between modern process formats and legacy process formats.

FIG. 3 illustrates exemplary translator 145 components, and functionality with respect to legacy process 110. Translator 145 includes an input translate component 340, translator memory 350, translator notification generator 360, translator GUI 370, and output translate component 380.

On the input side, input translate 340 accepts an input 120 in a modern format, translates the modern format input 120 into a legacy format input 320, and provides the legacy format input 320 to legacy process 110. Input translate 340 may automatically identify when translation is required and whether appropriate translation capability is available. Alternatively, input translate 340 may receive direction from a source external to translator 145 to perform a translation using a specific translation capability.

On the output side, output translate 380 accepts an output 330 from legacy process 110 in a legacy format, and translates the legacy format output 330 into a modern format output 130. Output translate 380 may automatically identify when translation is required and whether appropriate translation capability is available. Alternatively, output translate 380 may receive direction from a source external to translator 145 to perform a translation using a specific translation capability.

Both input translate 340 and output translate 380 may access translator memory 350 for instructions and/or data. Translator notification generator 360 and translator GUI 370 may also access translator memory 350 for instructions and/or data. Translator memory 350 is illustrated as a database for convenience, but may be any volatile or non-volatile memory type, or any combination of memory types, any of which may include one or more databases. Databases and memory types are described above in detail.

Translator 145 may include a notification generator 360 that responds to pre-identified circumstances by generating some form of notification 390. Types of notifications 390 may include but are not limited to email, pop-up windows, and log file entries. More than one type of notification 390 may be used. A particular type of notification 390 may be generated according to, e.g., the severity of the circumstances. For example, notification generator 360 may write an entry into a log file when a translation is completed. As another example, notification generator 360 may cause a pop-up window to appear in a control room if a translate queue reaches a predefined limit. As yet another example, notification generator 360 may send an email containing a notice that no applicable translation was available for modern format input 120.

Translator 145 may further include a translator graphic user interface (GUI) 370 that allows user control and monitoring of translator 145. GUI 370 may be any audiovisual interface between a user and translator 145.

Figure 4:
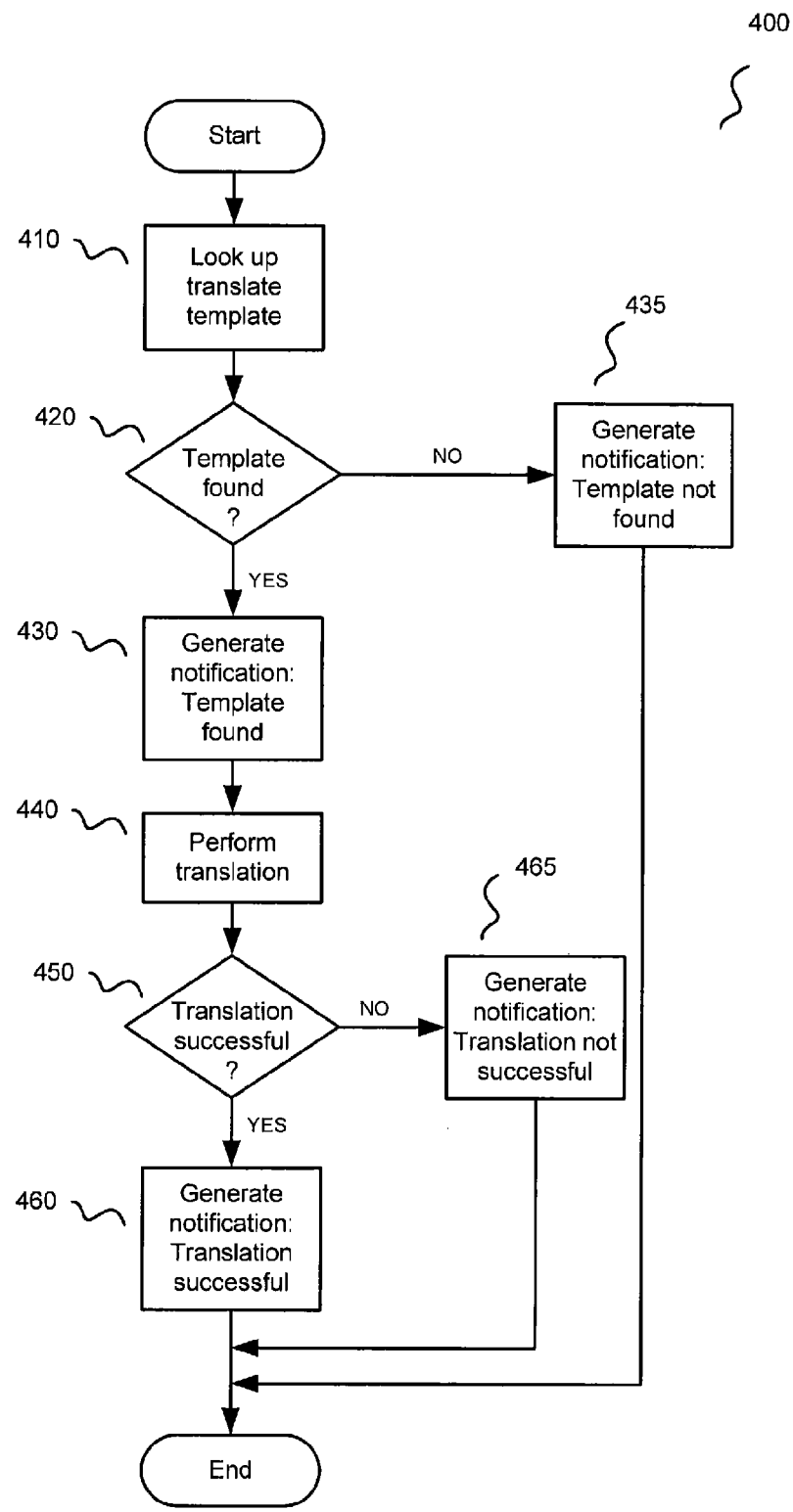
FIG. 4 illustrates an exemplary flow diagram for a translator.

FIG. 4 illustrates an exemplary process 400 that may be used for input translate 340 (or output translate 380).

At 410, based on either automatic or manual identification of the file to be translated, input translate 340 (output translate 380) identifies the modern format input 120 (legacy format output 330) and attempts to find a template for translating it into legacy format input 320 (modern format output 130).

At 420, if input translate 340 (output translate 380) determines that an appropriate template was found, process 400 continues at 430. Otherwise, process 400 continues at 435. At 435, translator notification generator 360 generates a notification 390 that an appropriate template was not found, then process 400 ends.

At 430, when an appropriate template is found, translator notification generator 360 generates a notification 390 that an appropriate translation template was found.

At 440, input translate 340 performs a translation from modern format input 120 to legacy format input 320 (output translate 380 performs a translation from legacy format output 330 to modern format output 130).

At 450, if input translate 340 (output translate 380) determines that the translation was successful, process 400 continues 450. Otherwise, process 400 continues at 465. At 465, translator notification generator 360 generates a notification 390 that the translation was unsuccessful, then process 400 ends.

At 460, when the translation is successful, translator notification generator 360 generates a notification 390 that the translation was successful, then process 400 ends.

Proper translation by input translate 340 and output translate 380 may be checked by rule checker 150.

As described above, rule checker 150 may facilitate both active and passive testing. Passive testing may be used to keep legacy process 110 functioning properly by preventing incorrectly-formatted inputs 120, or may be used to identify when new rules are needed. Active testing may be used to test the legitimacy of the existing rules. Rule checker 150 operates in parallel with translator 145, as discussed below with respect to FIGS. 6A-B.

Figure 5:
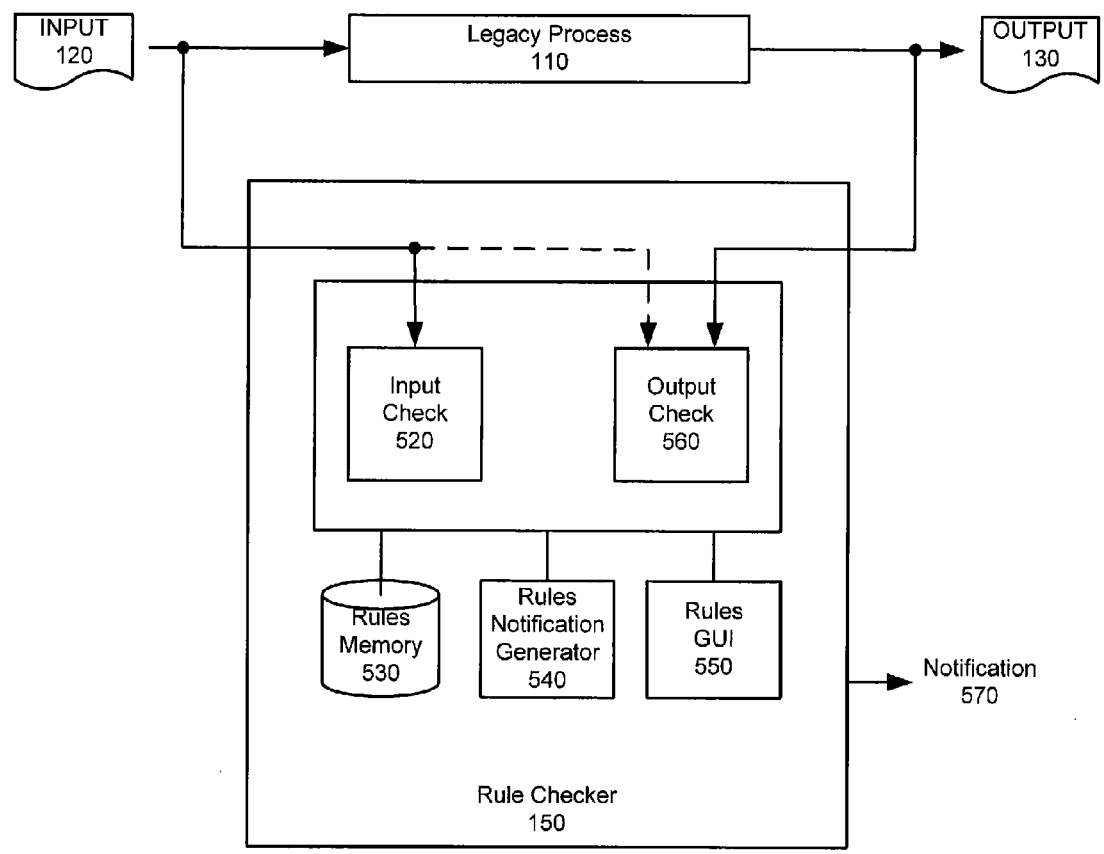
FIG. 5 illustrates an exemplary rule checker for verification of valid legacy process input file formats and output file formats.

FIG. 5 illustrates an exemplary implementation of rule checker 150 that includes an input check 520, a rules memory 530, a rules notification generator 540, a rules graphic user interface (GUI) 550, and an output check 560. Rule checker 150 may also generate a notification 570. In this implementation, rule checker 150 directly monitors inputs 120 and outputs 130 of legacy process 110.

Input check 520 validates an input 120 to legacy process 110 by determining whether the input 120 follows a predefined rule or set of rules. Similarly, output check 560 validates an output 130 from legacy process 110 by determining whether the output 130 follows a predefined rule or set of rules. Both input check 520 and output check 560 may access rules memory 530 for instructions and/or data. Rules notification generator 540 and rules GUI 550 may also access rules memory 530 for instructions and/or data. Rules memory 530 is illustrated as a database for convenience, but may be any volatile or non-volatile memory type, or any combination of memory types, any of which may include one or more databases. Databases and memory types are described above in detail.

Input check 520 validates input 120 format according to rules in rules memory 530. An example of an input rule included in rules memory 530 is that a customer data file must include a header of a certain length, a payload including particular fields such as per customer commodity usage and time of use, and an end block with status fields.

If input check 520 determines that an input 120 does not follow one or more applicable rules, the input 120 may be rejected, or may be allowed to pass into the system. The decision to allow or reject may be included in the applied rule itself or may instead be a separate rule.

Output check 560 validates output 130 format according to rules in rules memory 530. An example of an output rule included in memory 530 is that a billing statement sent to the printer based on the payload of a customer data file must include a proper-length customer account number, and properly formatted billing address, amount due, and date due.

Output check 560 may use rules related to whether an output 130 is valid according to a corresponding input 120. For example, for the aforementioned billing statement, the appropriate rule may be that the billing data on the statement must match the payload data of a customer data file received as an input 120. In this case, output check 560 must have access to inputs 120 as well as outputs 130. FIG. 5 illustrates this functionality by the dotted line from input 120 to output check 560.

If output check 560 determines that an output 130 does not follow one or more applicable rules, the output 130 may be blocked, or may be allowed to pass out of the system. The decision to allow or block may be included in the applied rule itself or may instead be a separate rule.

Rules notification generator 540 may generate a notification 570 indicating a failed rule check. Rules notification generator 540 may also generate a notification 570 indicating that an input 120 or output 130 passed the rule check, or even a notification that a rule check was performed.

Types of notifications 570 may include but are not limited to email, pop-up windows, and log file entries. More than one type of notification 570 may be used. A particular type of notification 570 may be generated according to, e.g., the severity of the circumstances. For example, notification generator 540 may write an entry into a log file when a rule check is completed. As another example, notification generator 540 may cause a pop-up window to appear in a control room if a particular rule check fails. As yet another example, notification generator 540 may send an email containing a summary of all rules applied during the last week.

Rule checker 150 may further include a rules graphic user interface (GUI) 550 that allows user control and monitoring of rule checker 150. GUI 550 may be any audiovisual interface between a user and rule checker 150.

Figure 6A:
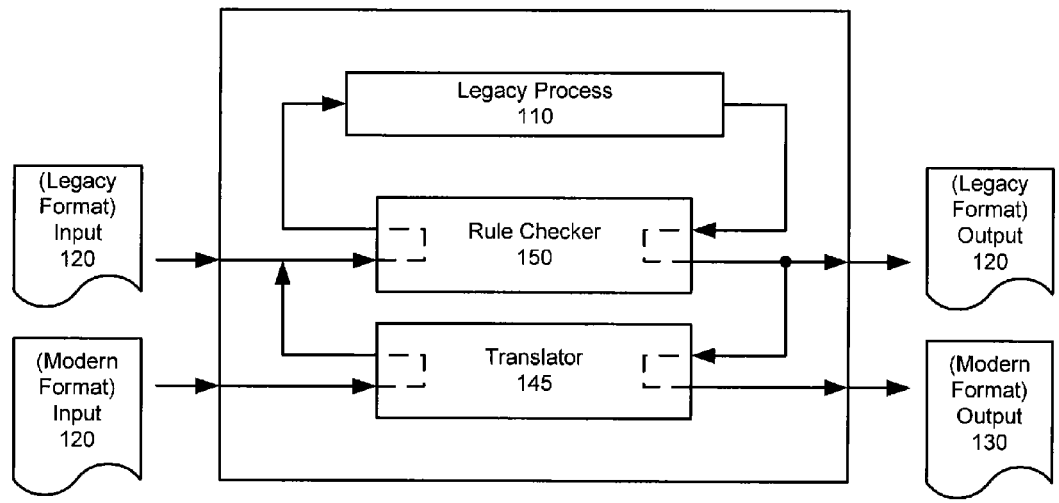
FIG. 6A illustrates an exemplary combined interface of a translator and a rule checker to an exemplary legacy process.
Figure 6B:
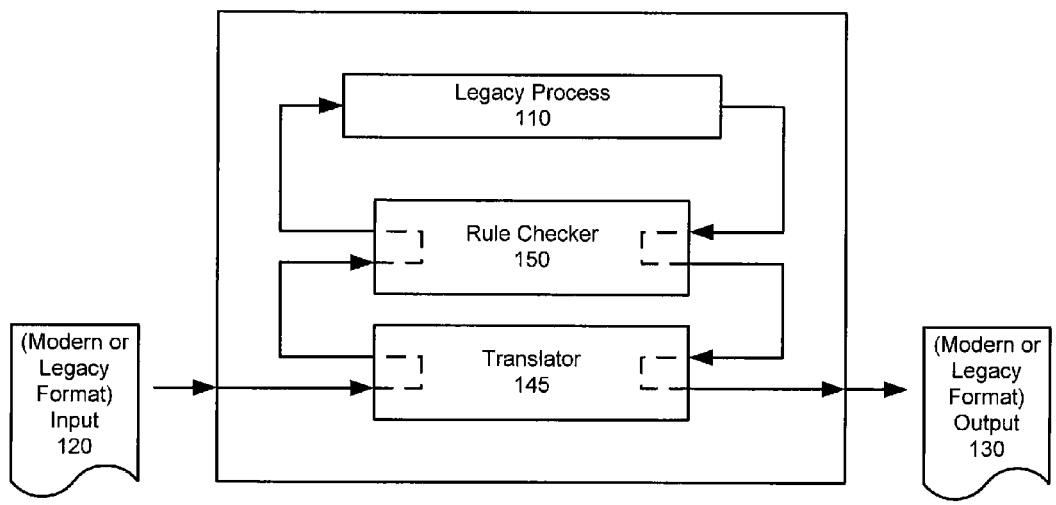
FIG. 6B illustrates another exemplary combined interface of a translator and a rule checker to a legacy process.

As mentioned above, rule checker 150 may operate in parallel with translator 145. FIGS. 6A-B illustrate two of the ways this parallel operation may be configured.

FIG. 6A illustrates rule checker 150 checking the inputs and outputs of legacy process 110, as described above with respect to FIG. 5. This configuration contemplates that input 120 in legacy format is routed to legacy process 110 directly and input 120 in modern format is routed to translator 145. Similarly, in this configuration, outputs 130 in legacy format would come from legacy process 110 directly, and only those outputs 130 requiring translation would be routed to translator 145 for translation into a modern format.

FIG. 6B illustrates a different configuration for the parallel operation of rule checker 150 and translator 145, in which rule checker 150 checks the inputs and outputs of translator 145. This configuration contemplates that all inputs 120, whether in legacy or modern format, are received by translator 145, and either passed through to legacy process 110 or translated first and then passed to legacy process 110, as applicable. Similarly, in this configuration, all outputs 130 from legacy process 110 are routed to translator 145 to be delivered unchanged or to be translated to outputs 120 in modern format if applicable. Therefore, this configuration contemplates that rules memory 530 includes rules not only for inputs 120 and outputs 130 in legacy format, but also for inputs 120 and outputs 130 in modern format.

Figure 7:
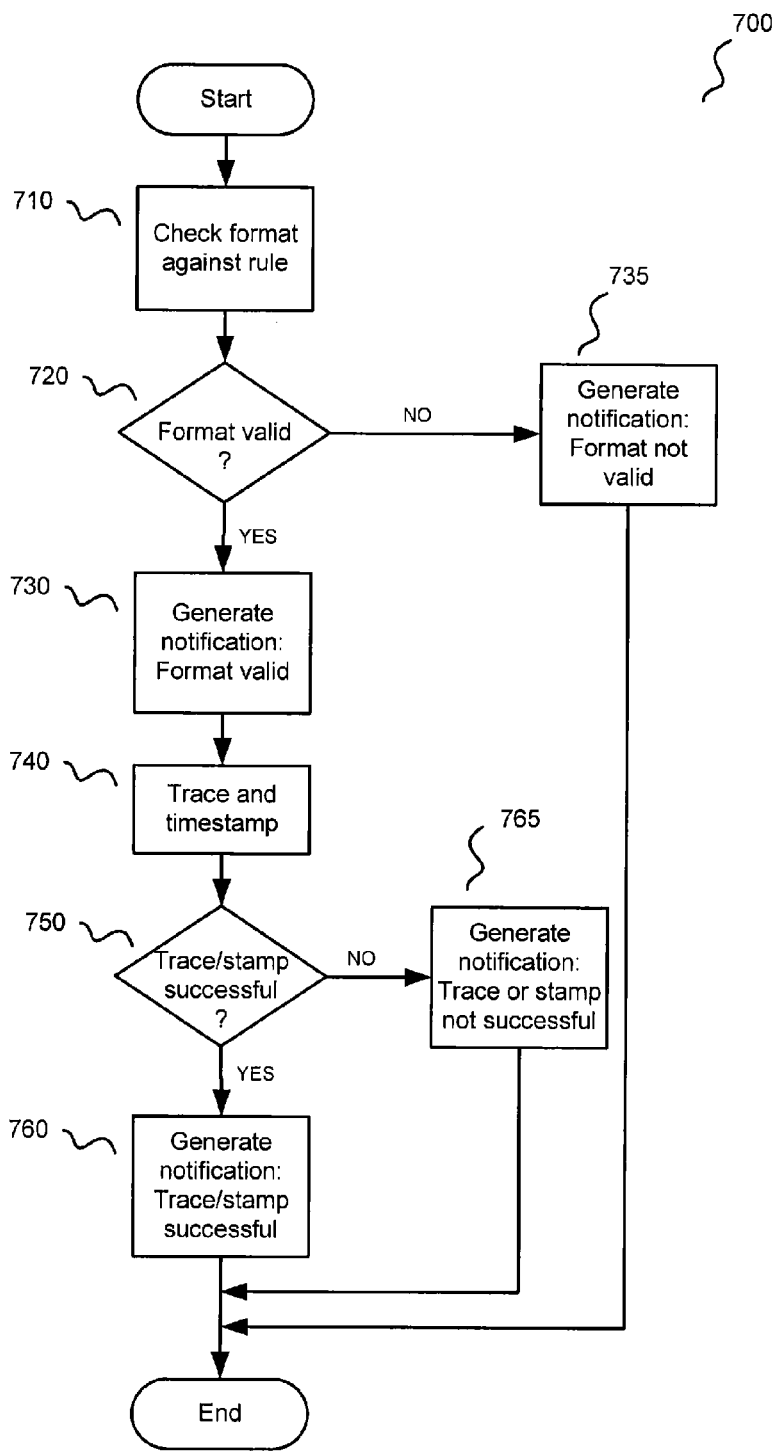
FIG. 7 illustrates an exemplary flow diagram for a rule checker.

FIG. 7 illustrates an exemplary process 700 for checking an input 120 or an output 130 according to a rule. Process 700 applies for any application of rule checker 150, including in the configurations shown in FIGS. 6A-B.

At 710, rule checker 150 checks the input 120 or output 130 against a rule from rules memory 530.

At 720, if the input 120 or output 130 has a valid format according to the applicable rule(s), process 700 continues at 730. Otherwise, process 700 continues at 735, wherein rules notification generator 540 generates a notification 570 indicating that the input 120 or output 130 did not have a valid format. Following 735, process 700 ends.

At 730, if the input 120 or output 130 has a valid format according to the applicable rule(s), rules notification generator 540 generates a notification 570 indicating that the input 120 or output 130 did have a valid format.

At 740, rule checker 150 traces and timestamps the input 120 or output 130. Tracing may include, e.g., copying the payload to rules memory 530 or another memory, logging that the input 120 or output 130 was checked against the rules, or tagging the input 120 or output 130 with an electronic marker such as a flag bit. Time stamping may include, e.g., adding a time code electronically to the input 120 or output 130, or adding a time indication to a log file.

At 750, rule checker 150 verifies that the trace and stamp operations were successful. If successful, process 700 continues at 760. Otherwise, process 700 continues at 765, wherein rules notification generator 540 generates a notification 570 that the trace and stamp was unsuccessful. Following 765, process 700 ends.

At 760, if the trace and stamp operations were successful, rules notification generator 540 generates a notification 570 that the trace and stamp was successful. Following 760, process 700 ends.

As mentioned above, rule checker 150 may facilitate both passive and active testing. Three examples of functionality facilitated by rule checker 150 are described next.

A first exemplary functionality facilitated by rule checker 150 is behavioral definition, a passive monitoring of the behavior of legacy process 110. Rule checker 150 performs checks of the inputs 120 and outputs 130, and based on the checks may perform tracing and time-stamping functions, generate notifications 570, copy payload data to a memory, etc. Information gathered with respect to the inputs 120 and outputs 130 may then be analyzed to determine the behavior of legacy process 110 and define rules of behavior to add to rules memory 530. For example, a message sent to legacy process 110 may be expected to cause a particular action by legacy process 110, according to an applicable rule, but instead causes a different action. Rule checker 150 may then save information about the incoming message along with the actual action taken by legacy process 110. Behavior analysis may show that modification of the applied rule is necessary, or that a new rule is necessary.

A second exemplary functionality facilitated by rule checker 150 is protective of legacy process 110. Rule checker 150 performs checks of the inputs 120 and outputs 130, and based on the checks may reject an input 120 or block an output 130. For example, a particular type of input 120 may cause legacy process 110 to "hang up", i.e., to stop operating. To keep legacy process 110 operational, rule checker 150 may reject such an input 120. As another example, legacy process 110 may, under certain circumstances, generate an output 130 that causes a printer to print endless pages of meaningless characters, causing both paper waste and lost printer time. To prevent this occurrence, rule checker 150 may check for that type of output 130 and block it from issuance.

A third exemplary functionality facilitated by rule checker 150 is an active test to determine the legitimacy of existing rules. An input 120 with specific test content is submitted to legacy process 110. An output 130 generated by legacy process 110 may then be compared to an expected output 130 predicted by an applicable rule. For example, a document known to be in correct format may be submitted to legacy process 110, and a corresponding output 130 compared to a predicted output. If the actual output is equivalent to a first predicted output by the rule, then the rule is legitimate for at least a correctly-formatted input. A further check of the same rule may entail submitting to legacy process 110 a purposely incorrectly formatted document and comparing a corresponding output 130 to a second predicted output. If the actual and second predicted outputs are equivalent, then the rule is legitimate at least for the particular incorrect format of the test document. If, however, there is a discrepancy between the actual and predicted outputs, then the rule may need to be modified.

Figure 8:
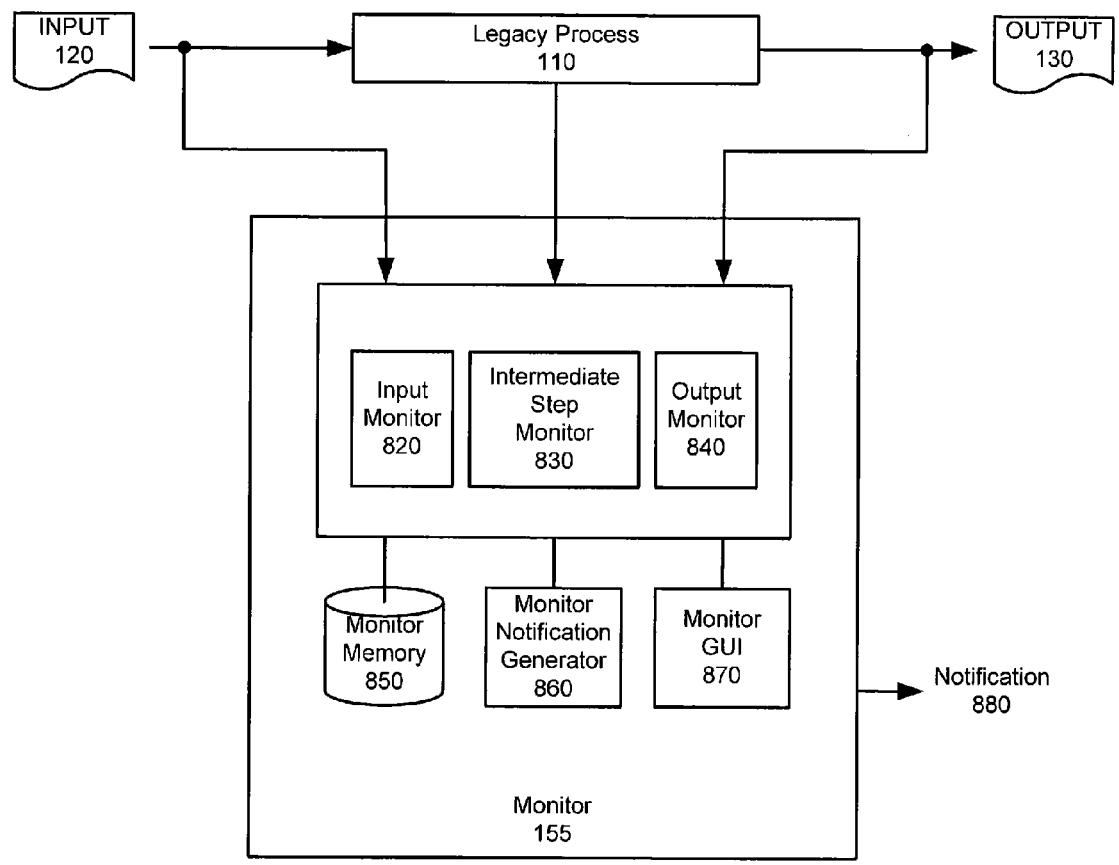
FIG. 8 illustrates an exemplary monitor for a legacy process.

FIG. 8 illustrates an exemplary monitor 155 that may be used to gather data for use in creating or vetting behavioral rules. The data gathered by monitor 155 may complement and perhaps overlap the data gathered by rule checker 150. Monitor 155 is generally passive.

Monitor 155 includes an input monitor 820 monitoring inputs 120 to legacy process 110, an intermediate step monitor 830 monitoring actions of processes internal to legacy process 110, an output monitor 840 monitoring outputs 130 from legacy process 110, a monitor memory 850, a monitor notification generator 860, and a monitor graphical user interface (GUI) 870. Monitor 155 may generate notifications 880.

Input monitor 820, intermediate step monitor 830, and output monitor 840 may access monitor memory 850 for instructions and/or data. Monitor notification generator 860 and monitor GUI 870 may also access monitor memory 850 for instructions and/or data. Monitor memory 850 is illustrated as a database for convenience, but may be any volatile or non-volatile memory type, or any combination of memory types, any of which may include one or more databases. Databases and memory types are described above in detail.

Monitor 155 may be configured to gather a broad variety of information, as well as mass quantities of information. Subsets of this information may be used when creating new rules or when vetting existing rules. The amount and type of information gathered may be set by a user through GUI 870. For example, when creating a new rule, a user may use the GUI to configure monitor 155 to gather small amounts of each of a variety of information types over a long period of time. Conversely, when a rule has already been defined and is being tested by rule checker 150, a user may use the GUI to configure monitor 155 to gather large amounts of a few types of information over a short period of time. Through GUI 870, a user may also define new types of information to be gathered by input monitor 820, intermediate step monitor 830, or output monitor 840.

Input monitor 820 gathers information from inputs 120. The information may include type, for example, a word processing file, an email, or a network data packet. The information may include size or time of arrival of input 120, header content, links to other information, payload data, etc.

Intermediate step monitor 830 gathers information regarding actions performed internal to legacy process 110. For example, a sub-process may generate indices into a look-up table and write the indices into memory 850, and then another sub-process may use the indices to access the table and deliver the appropriate contents as an output 130. Knowledge of the existence of the look-up table may be as important as the actual contents of the output 130. Continuing with the example, intermediate step monitor 830 may note the change in memory 850 when the indices are written to memory. Subsequently, output 130 may be identified as being related to the memory change and this information may be used to identify that output 130 is from a table. Further analysis may then show the limits and contents of the table, and other sub-processes that access the table. Such internal access to legacy process 110 allows for more efficient and thorough creation of rules.

Output monitor 840 gathers information from outputs 130. Such information may be the same types of information gathered by input monitor 820 from inputs 120, as described above. However, the gathered information from inputs 120 and outputs 130 need not be the same or similar.

Monitor notification generator 860 may generate notifications 880 at the occurrence of any predefined set of circumstances. A user may define or edit such circumstances through GUI 870. For example, a user may define that a notification email be sent when the end of data-gathering time is reached. As another example, a user may define that a pop-up window notification should appear if a data item exceeds a certain storage size limit.

Monitor 155, in addition to use during rule definition and checking, may be used to flag anomalies in a process or in data. For example, monitor 155 may generate a notification 880 if a rebate check is issued for one million dollars, when rebates are limited to one hundred dollars. A user may select through the GUI to monitor certain key functions to allow timely notification to prevent such anomalies from creating a problem.

Figure 9:
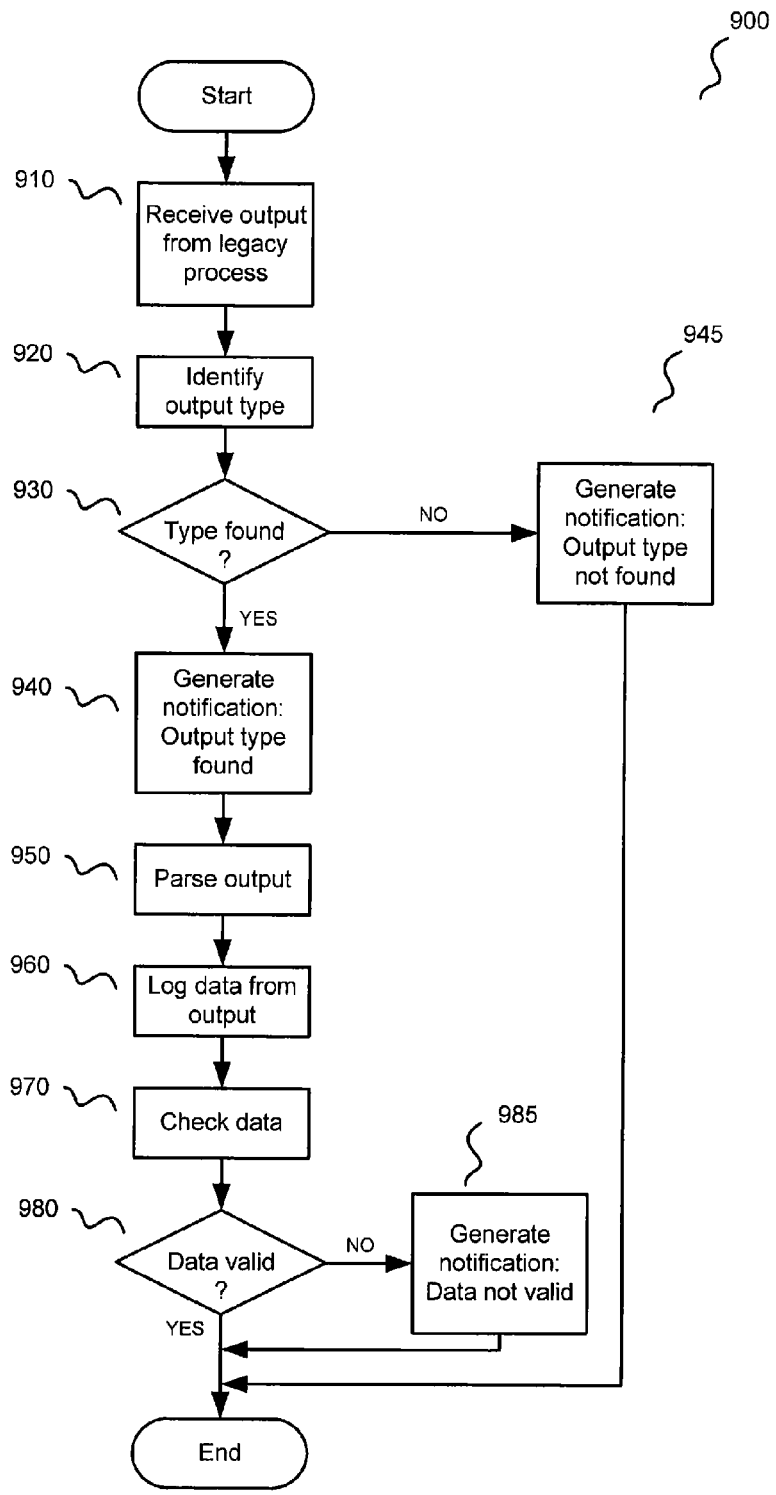
FIG. 9 illustrates an exemplary flow diagram for an exemplary monitor.

FIG. 9 illustrates an exemplary process 900 for output monitor 840 to monitor outputs 130. Process 900 may be used, for example, to identify the anomalous rebate check discussed above.

In 910, output monitor 840 receives an output 130 from legacy process 110.

At 920, output monitor 840 attempts to identify the type of output 130.

At 930, if output monitor 840 was successful in identifying the output 130 type, process 900 continues at 940. Otherwise, at 945, monitor notification generator 860 issues a notification 880 that identification was not successful, and then process 900 ends.

At 940, when output 130 type is successfully identified, monitor notification generator 860 issues a notification 880 that identification was successful.

At 950, the received output 130 is parsed to extract the desired data from output 130.

At 960, the desired data from output 130 is logged.

At 970, the logged data is checked for validity, for example for size or value.

At 980, if output monitor 840 determines that the data is valid, process 900 ends. Otherwise, monitor notification generator 860 issues a notification 880 that the data was not valid, and then process 900 ends.

Thus, monitor 155 may be used to gather data regarding inputs 120, outputs 130, and internal actions of legacy process 110, which may then be used to characterize the behavior of legacy process 110 in a set of rules. Monitor 155 may then be used to gather data to verify that existing rules are valid. Monitor 155 may further be used to flag anomalous data.

Monitor 155 and rule checker 150 may be used concurrently for the purposes of determining new rules and validating existing rules. Additionally, translator 145 may operate concurrently with either or both monitor 155 and rule checker 150.

Figure 10:
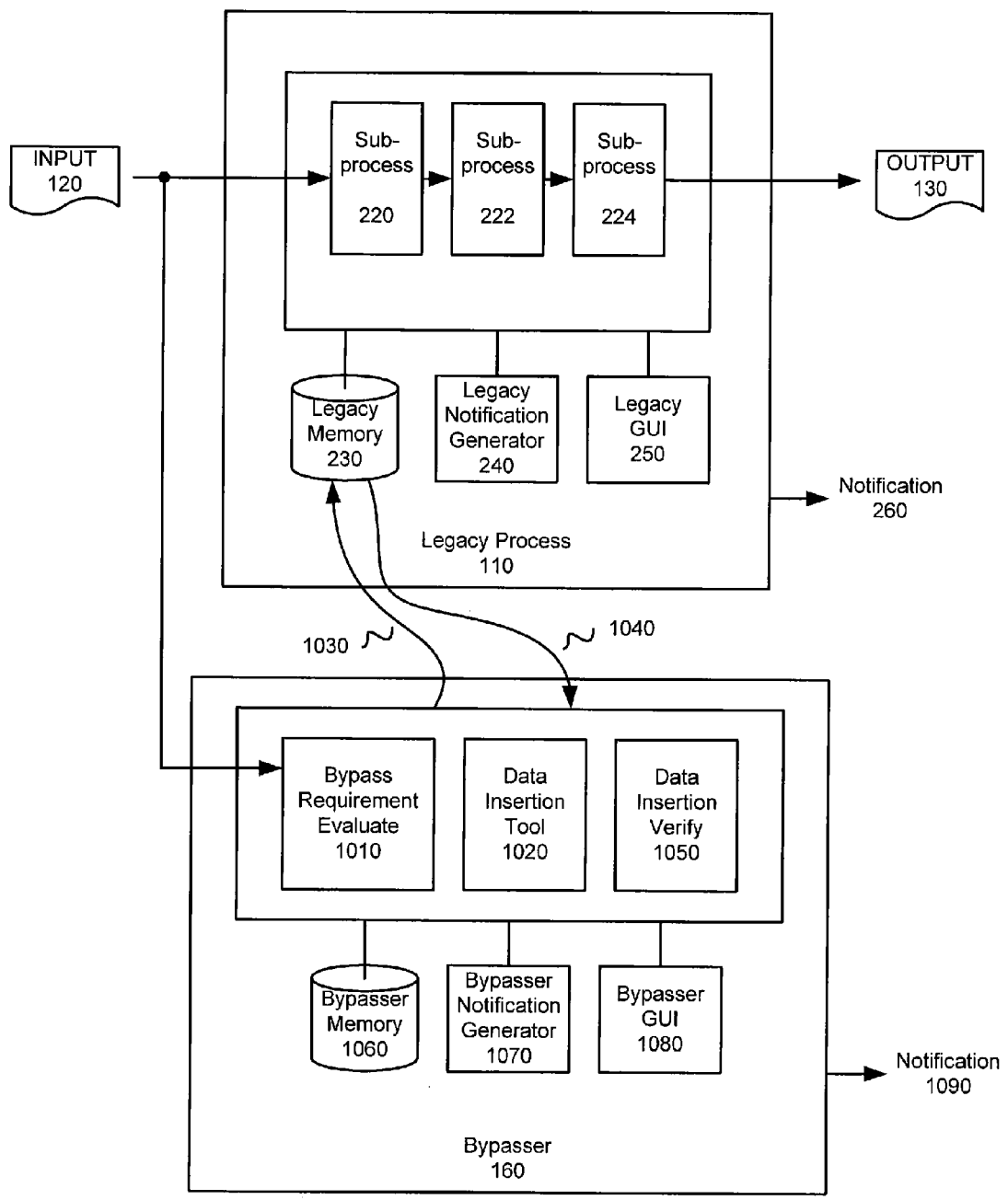
FIG. 10 illustrates an exemplary bypasser for direct access to a legacy process memory.

FIG. 10 illustrates an exemplary bypasser 160 that provides direct access to legacy memory 230. Bypasser 160 includes a bypass requirement evaluate 1010, a data insertion tool 1020, interfaces 1030 and 1040 to legacy process 110 memory 230, a data insertion verify 1050, a bypasser memory 1060, a bypasser notification generator 1070, and a bypasser graphic user interface (GUI) 1080. Bypasser 160 may generate notifications 1090.

A legacy process 110 may have an inherent "bug" that causes legacy process 110 to consistently perform some action incorrectly. Upon identifying the incorrect performance, a "fix" may be implemented to automatically correct the result as necessary. One such fix is to access legacy memory 230 with bypasser 160 and make changes directly to memory 230. For example, if legacy process 110 stores blocks of customer data in which each row should include a year, but a portion of the block is always missing the year, bypasser 160 could include a function to add the year information where it is missing. Bypasser 160 may automatically perform this task when conditions indicate that new customer data has been saved. Alternatively, bypasser 160 could be triggered to fix data known to be incorrect.

Bypass requirement evaluate 1010 as illustrated in FIG. 10 accepts input 120 and evaluates whether direct access into legacy memory 230 will be required. Bypass requirement evaluate 1010 alternatively may monitor legacy memory 230 for certain changes that indicate direct access to memory 230 is required. Bypass requirement evaluate 1010 may also receive a command to perform direct access modification of legacy memory 230.

Upon determination that direct access modification to legacy memory 230 is required, data insertion tool 1020 writes the necessary information into legacy memory 230. A write to legacy memory 230 includes any necessary steps according to manufacturer instructions for writing to a memory, such as first erasing the memory location.

After data insertion tool 1020 completes its task, data insertion verify 1050 checks that the data was written correctly to legacy memory 230.

Bypass requirement evaluate 1010, data insertion tool 1020, and data insertion verify 1050 may access bypasser memory 1060 for instructions and/or data. Bypasser notification generator 1070 and bypasser GUI 1080 may also access bypasser memory 1060 for instructions and/or data. Bypasser memory 1060 is illustrated as a database for convenience, but may be any volatile or non-volatile memory type, or any combination of memory types, any of which may include one or more databases. Databases and memory types are described above in detail.

Bypass notification generator 1070 may generate notifications 1090 in any predefined set of circumstances. For example, a notification 1090 may be generated when data is written to legacy memory 230 and another notification 1090 may be generated when the written data is verified.

Types of notifications 1090 may include but are not limited to email, pop-up windows, and log file entries. More than one type of notification 1090 may be used. A particular type of notification 1090 may be generated according to, for example, the severity of the circumstances. For example, notification generator 1070 may write an entry into a log file when a data insertion is completed. As another example, notification generator 1070 may cause a pop-up window to appear in a control room if the verification of the inserted data fails. As yet another example, notification generator 1070 may send an email containing a summary of the number of times a data insertion has been performed during the last ten hours.

GUI 1080 allows user control and monitoring of bypasser 160. GUI 1080 may be any audiovisual interface between a user and bypasser 160.

Figure 11:
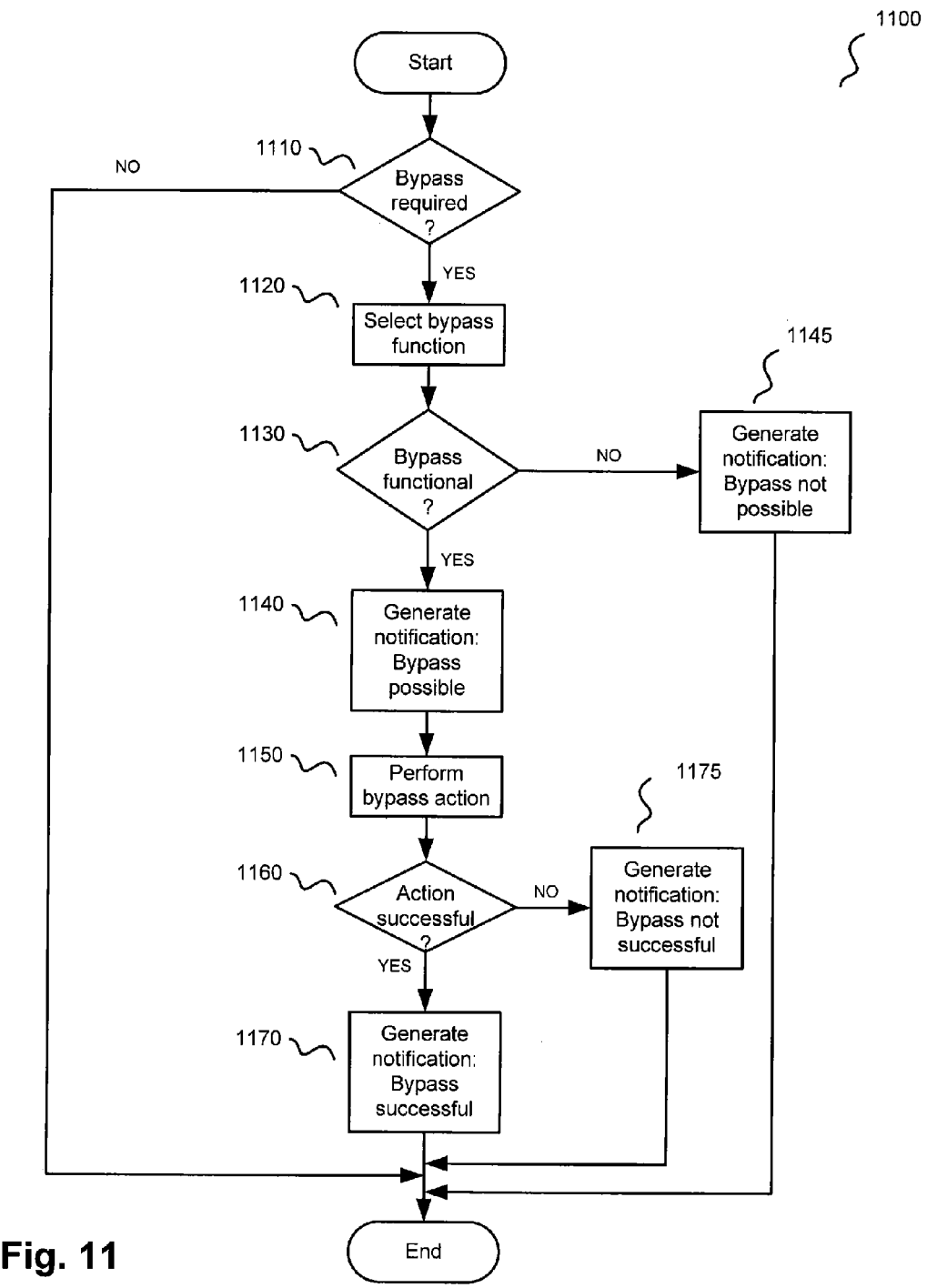
FIG. 11 illustrates an exemplary flow diagram for a bypasser.

FIG. 11 illustrates an exemplary process 1100 for bypasser 160 action.

At 1100, bypass requirement evaluate 1010 determines whether a bypass is required or has been requested externally. If yes, process 1100 continues at 1120. Otherwise, process 1100 ends.

At 1120, bypass requirement evaluate 1010 selects the appropriate bypass function to apply.

At 1130, bypass requirement evaluate 1010 determines if it has enough information to complete the bypass operation. If so, process 1100 continues at 1140. Otherwise, at 1145, bypasser notification generator 1070 issues a notification 1090 that the requested bypass is not possible, and then process 1100 ends.

At 1140, if bypass requirement evaluate 1010 determines that the bypass operation is possible, notification generator 1070 issues a notification 1090 that the requested bypass is possible.

At 1150, data insertion tool 1020 performs the bypass operation.

At 1160, data insertion verify 1050 determines if the bypass operation was successful. If it was, process 1100 continues at 1170. Otherwise, notification generator 1070 issues a notification that the operation was not successful, and then process 1100 ends.

At 1170, if data insertion verify 1050 determines that the bypass operation was successful, notification generator 1070 issues a notification that the operation was successful, and then process 1100 ends.

The bypass operations defined for bypasser 160 may be used to further refine the set of rules that behaviorally describe legacy process 110.

Legacy Interface/Probe Shared Elements

Although legacy interface/probe tool suite components translator 145, rule checker 150, monitor 155, and bypasser 160 are illustrated each with its own memory, notification generator, graphic user interface (GUI), and notifications, any or all of these services may be shared between one or more of the components of legacy interface/probe 140.

Notifications may be optional, and may be turned on and off at will through an applicable GUI.

The longer legacy interface/probe 140 operates, the more behavioral rules may be defined. Legacy mimic 190 represents a complete or nearly complete set of behavioral rules identified from legacy process 110 and implemented within a new system. The establishment of legacy mimic 190 allows legacy process 110 to be decommissioned. Alternatively, legacy mimic 190 allows legacy process 110 to be duplicated to provide greater throughput capability.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    gathering information with respect to inputs, outputs, and internal function of a legacy process by monitoring the legacy process during operation of the legacy process, the legacy process implemented by a legacy system of hardware components and software components;
    storing the information in a memory in communication with a processing device;
    defining from the gathered information a set of rules describing at least part of the behavior of the legacy system, wherein behavior is the sum of the responses of the legacy system to the set of possible legacy system inputs;
    testing a rule from the set of rules by first applying known valid inputs to the legacy process and verifying that the legacy system responds as predicted by the rule, and second applying known invalid inputs to the legacy process and verifying that the legacy system responds as predicted by the rule.

2. The method of claim 1, wherein the gathered information includes one of payload data parsed from an input; input file type; and legacy system internal memory changes 3. The method of claim 1, further comprising replacing the legacy system with a new system that mimics the legacy system, the new system based on at least a subset of rules of the set of rules.

4. The method of claim 3, wherein the new system includes hardware components that are of different type from the hardware components of the legacy system, wherein type is one of a model number and a revision number.

5. The method of claim 1, wherein the set of rules is divided into subsets of rules, each subset of rules describing behavior of a subsystem of the legacy system.

6. The method of claim 5, further comprising replacing a legacy subsystem with a new subsystem that mimics the legacy subsystem, the new subsystem based on a subset of rules.

7. The method of claim 6, wherein the new subsystem includes hardware components that are of different type from the hardware components of the legacy subsystem, wherein type is at least one of model number and revision number.

8. The method of claim 1, wherein the set of rules is defined such that it may be implemented by compiling the rules into instructions for at least one processing device.

9. The method of claim 1, further comprising translating modern format inputs into legacy format inputs that may be recognized by the legacy system.

10. A method comprising:
    monitoring legacy system responses to legacy system inputs, performing the monitoring at least in part by a processor executing instructions from a tangible computer readable medium;
    defining a set of rules describing behavior of the legacy system based on the legacy system responses to the inputs, wherein behavior is the sum of the responses of the legacy system to the set of possible legacy system inputs;

comparing actual and predicted legacy system responses to the inputs, the predicted legacy system responses being predicted by the set of rules; and creating a replacement system for the legacy system using the set of rules if the actual and predicted legacy system responses are substantially equivalent.

11. The method of claim 10, wherein the replacement system includes hardware components that are of different type from the hardware components of the legacy system, wherein type is at least one of model number and revision number.

12. The method of claim 10, wherein the set of rules is divided into subsets of rules, each subset of rules describing behavior of a subsystem of the existing system.

13. The method of claim 12, further comprising replacing a legacy subsystem with a new subsystem that mimics the legacy subsystem, the new subsystem based on a subset of rules.

14. The method of claim 13, wherein the new subsystem includes hardware components that are of different type from the hardware components of the legacy subsystem, wherein type is at least one of model number and revision number.

15. The method of claim 10, wherein the set of rules is defined such that it may be implemented by compiling the rules into instructions for one of a plurality of different processor types.

16. The method of claim 10, further comprising generating a notification based on the comparison of the actual responses to the predicted responses.

17. A system comprising:
a memory storing a set of rules, the rules describing the behavior of a legacy system; and
a processor in communication with the memory executing instructions tangibly embodied on a computer readable medium to implement at least in part
a monitor gathering data with respect to inputs, outputs, and internal actions of the legacy system;
a rule checker that validates the set of rules by confirming that the actual responses of the legacy system to inputs of the legacy system are substantially equivalent to the responses predicted by the rules, the rule checker also checking that the inputs to and outputs from the legacy system are in a valid format;
a translator that translates modern format inputs into legacy format inputs that may be recognized by the legacy system; and
a bypasser that allows direct access to memory in the legacy system.

18. The system of claim 17, wherein the set of rules is organized in subsets, such that each subset of rules may be implemented as a new subsystem independently of the other subsets of rules.

19. The system of claim 17, wherein gathering data includes one of parsing the inputs to extract payload data; identifying an input file type; and logging changes made by the system to an internal memory.

20. The system of claim 17, further comprising replacing the legacy system with a new system that mimics the legacy system, the new system based on at least a subset of rules of the set of rules.

21. The system of claim 20, wherein the new system includes hardware components that are of different type from the hardware components of the legacy system, wherein type is at least one of model number and revision number.

22. The system of claim 17, wherein the set of rules is divided into subsets of rules, each subset of rules describing behavior of a subsystem of the legacy system.

23. The system of claim 22, further comprising replacing a legacy subsystem with a new subsystem that mimics the legacy subsystem, the new subsystem based on a subset of rules.

24. The system of claim 23, wherein the new subsystem includes hardware components that are of different type from the hardware components of the legacy subsystem, wherein type is at least one of model number and revision number.

25. The system of claim 17, wherein the set of rules is defined such that it may be implemented by compiling the rules into instructions for at least one processing device.

* * * * *